US012610885B2

(12) United States Patent
Jiang et al.

(10) Patent No.: US 12,610,885 B2
(45) Date of Patent: Apr. 28, 2026

(54) WORKING MACHINE

(71) Applicant: MAKITA CORPORATION, Anjo (JP)

(72) Inventors: Qinzhou Jiang, Jiangsu (CN); Zhihua Lin, Jiangsu (CN); Pengsheng Wang, Jiangsu (CN)

(73) Assignee: MAKITA CORPORATION, Anjo (JP)

( * ) Notice: Subject to any disclaimer, the term of this patent is extended or adjusted under 35 U.S.C. 154(b) by 1083 days.

(21) Appl. No.: 17/581,526

(22) Filed: Jan. 21, 2022

(65) Prior Publication Data

US 2022/0232766 A1     Jul. 28, 2022

(30) Foreign Application Priority Data

Jan. 22, 2021     (CN) .......................... 202110087072.4

(51) Int. Cl.
    *A01D 34/78*          (2006.01)
    *A01D 34/67*          (2006.01)
    (Continued)

(52) U.S. Cl.
    CPC ............. *A01D 34/78* (2013.01); *A01D 34/81* (2013.01); *A01D 34/67* (2013.01); *A01D 2101/00* (2013.01)

(58) Field of Classification Search
    CPC ........ A01D 34/78; A01D 34/81; A01D 34/67; A01D 2101/00
    See application file for complete search history.

(56) References Cited

U.S. PATENT DOCUMENTS

| | | | | |
|---|---|---|---|---|
| 5,924,893 A * | 7/1999 | Eidsvig | .................. | H01R 13/74 |
| | | | | 439/551 |
| 6,621,246 B2 * | 9/2003 | Kubale | ..................... | B25F 5/02 |
| | | | | 320/112 |

(Continued)

FOREIGN PATENT DOCUMENTS

| | | |
|---|---|---|
| CN | 102832362 A | 12/2012 |
| CN | 112237105 A | 1/2021 |

(Continued)

OTHER PUBLICATIONS

Machine Translation of JP2018186018A (Nov. 7, 2025) (Year: 2025).*

(Continued)

*Primary Examiner* — Matthew J Merkling
(74) *Attorney, Agent, or Firm* — Sughrue Mion, PLLC

(57)                    ABSTRACT

A working machine may be configured to operate with electric power supplied from a first power supply or a second power supply and configured to be used in a state of being in contact with a ground. Each of the first power supply and the second power supply may include a battery cell; a housing configured to house the battery cell; a power cable extending from the housing and configured to discharge electric power; and a connector disposed at an end of the power cable. The housing of the first power supply and the housing of the second power supply may have different shapes from each other. The working machine may include a power supply receptacle to which either the first power supply or the second power supply is configured to be detachably attached; and a connector coupler configured to be coupled with the connector.

2 Claims, 17 Drawing Sheets

(51) Int. Cl.
  A01D 34/81        (2006.01)
  A01D 101/00      (2006.01)

(56)             References Cited

U.S. PATENT DOCUMENTS

| 2005/0077873 | A1* | 4/2005 | Watson | H01M 50/296 |
| | | | | 320/114 |
| 2005/0083639 | A1* | 4/2005 | Zick | H01M 50/202 |
| | | | | 361/600 |
| 2012/0321912 | A1 | 12/2012 | Hachisuka et al. | |
| 2016/0183451 | A1* | 6/2016 | Conrad | A01D 34/66 |
| | | | | 56/10.2 R |
| 2021/0015034 | A1 | 1/2021 | Ito et al. | |
| 2021/0169007 | A1* | 6/2021 | Xiao | A01D 34/78 |

FOREIGN PATENT DOCUMENTS

| EP | 2 534 936 A1 | 12/2012 |
| JP | 2001-179658 A | 7/2001 |
| JP | 2013-000029 A | 1/2013 |
| JP | 2018186018 A * | 11/2018 |
| WO | 2013/027772 A1 | 2/2013 |
| WO | 2019/244845 A1 | 12/2019 |

OTHER PUBLICATIONS

Communication dated Sep. 22, 2025 in Chinese Application No. 202110087072.4.
Communication dated Feb. 27, 2026 in Chinese Application No. 202110087072.4.

* cited by examiner

UP

LEFT

REAR

FRONT

RIGHT

DOWN

FRONT

LEFT ←→ RIGHT

REAR

WORKING MACHINE

CROSS-REFERENCE TO RELATED APPLICATION

This application claims priority to Chinese Patent Application No. 202110087072.4 filed on Jan. 22, 2021, the entire contents of which are hereby incorporated by reference into the present application.

TECHNICAL FIELD

This disclosure herewith relates to a working machine.

BACKGROUND

Japanese Patent Application Publication No. 2013-000029 describes a working machine. The working machine is operable using electric power supplied from a battery pack, and is used in a state of being in contact with a ground. The working machine includes a battery pack receptacle to which the battery pack can be attached.

SUMMARY

When a long workable time is required for the working machine disclosed in Japanese Patent Application Publication No. 2013-000029, a power supply having a rated capacity larger than a rated capacity of the battery pack is used instead of the battery pack. There are various types of power supplies having different housing shapes. The present specification discloses a technique in which a plurality of types of power supplies having different housing shapes can be used in a working machine.

A working machine disclosed herein may be configured to operate with electric power supplied from a first power supply or a second power supply and configured to be used in a state of being in contact with a ground. Each of the first power supply and the second power supply may comprise a battery cell; a housing configured to house the battery cell; a power cable extending from the housing and configured to discharge electric power; and a connector disposed at an end of the power cable. The housing of the first power supply and the housing of the second power supply may have different shapes from each other. The working machine may comprise a power supply receptacle to which either the first power supply or the second power supply is configured to be detachably attached; and a connector coupler configured to be coupled with the connector.

In the above configuration, the working machine can be used with the first power supply being attached to the power supply receptacle, or the working machine can also be used with the second power supply having a housing shape different from that of the first power supply being attached to the power supply receptacle. Due to this, a plurality of types of power supplies having different housing shapes can be used for a working machine.

DETAILED DESCRIPTION

Figure 1:
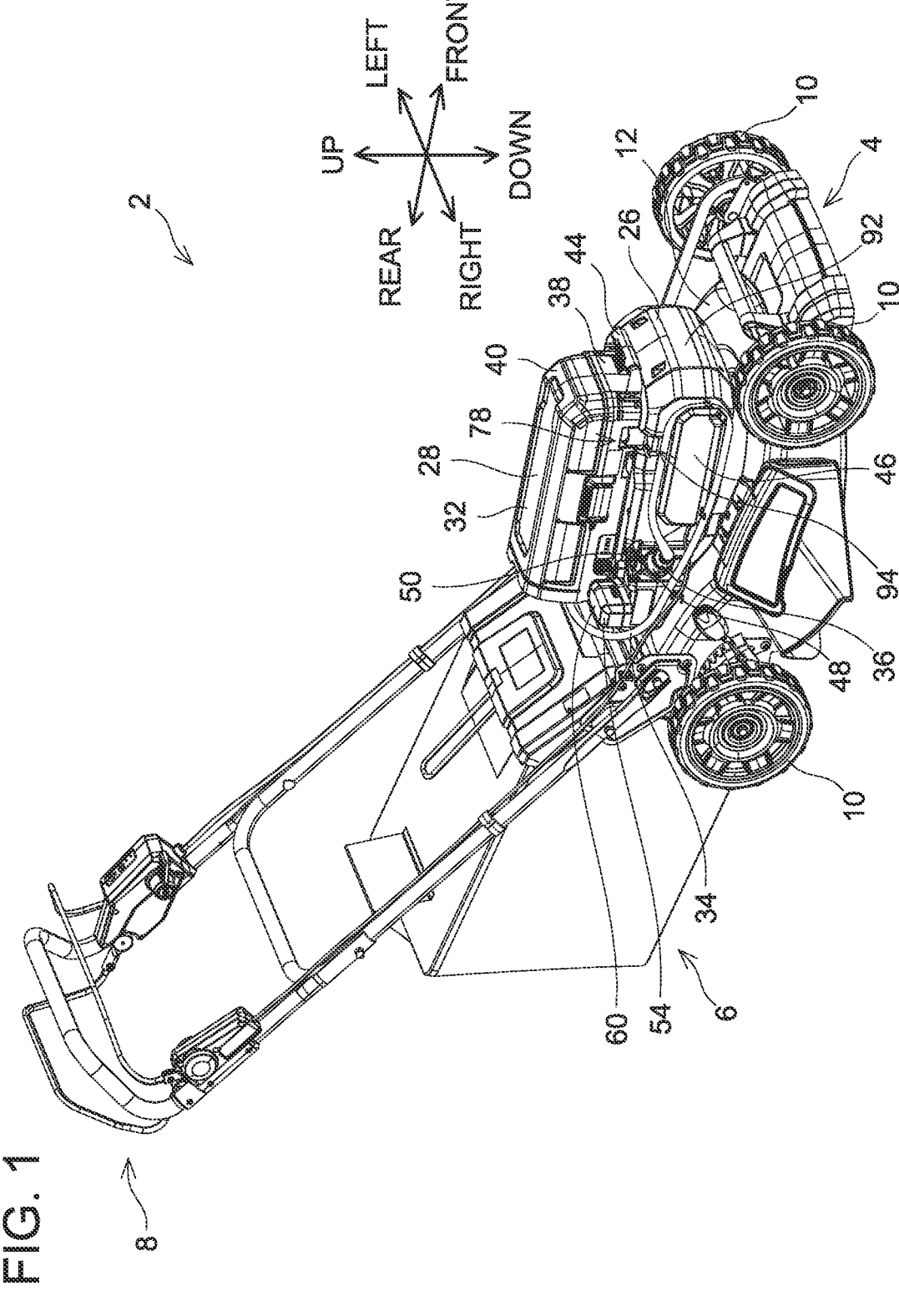
FIG. 1 is a perspective view of a working machine 2 to which a first power supply 28 according to an embodiment is attached.

Representative, non-limiting examples of the present disclosure will now be described in further detail with reference to the attached drawings. This detailed description is merely intended to teach a person of skill in the art further details for practicing preferred aspects of the present teachings and is not intended to limit the scope of the present disclosure. Furthermore, each of the additional features and teachings disclosed below may be utilized separately or in conjunction with other features and teachings to provide improved working machines, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure, furthermore, various features of the above-described and below-described representative examples, as well as the various independent find dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or toe claims. In addition, all value ranges or indications of groups of entities are intended to disclose every possible intermediate value or intermediate entity for the purpose of original written disclosure, as well as for the purpose of restricting the claimed subject matter.

In one or more aspects of the present teachings, the first power supply may further comprise a first specific engagement part, disposed on the housing of toe first power supply. The second power supply may further comprise a second specific engagement part disposed on the housing of die second power supply. The power supply receptacle may comprise a first machine-side engagement part disposed at a position corresponding to the first specific engagement part and engageable with the first specific engagement part to fix the first power supply to the power supply receptacle; and a second machine-side engagement part disposed at a position corresponding, to the second specific engagement part and engageable with the second specific engagement part to fix the second power supply to the power supply receptacle.

In the above configuration, die first power supply can be firmly fixed to the power supply receptacle, and the second power supply can be firmly fixed to the power supply receptacle.

In one or more aspects of the present teachings, each of the first power supply and the second power supply may further comprise a common engagement part disposed on die housing. The power supply receptacle may further comprise a third machine-side engagement part disposed at a position corresponding to the common engagement part of each of both the first and second power supplies and engageable with the common engagement part to fix either the first power supply or the second power supply to die power supply receptacle.

In the above configuration, the third machine-side engagement part is engageable with the common engagement part of the first power supply and also is engageable with the common engagement part of the second power supply. Thus, the configuration of the power supply receptacle can be prevented from becoming complicated.

Embodiment

A working machine 2 according to an embodiment will be described with reference to FIGS. 1 to 17. As shown in FIG. 1, the working machine 2 is a lawn mower. The working machine 2 is operable using power supplied from a first power supply 28 or a second power supply 30 described later. The working machine 2 is used in a state of being in contact with a ground. The working machine 2 comprises a body unit 4, a grass collector unit 6, and a handle unit 8. The body unit 4 includes four wheels 10 that are in contact with the ground. The grass collector unit 6 is detachably attached to a rear end of the body unit 4. The handle unit 8 is connected to a rear upper portion of the body unit 4. When a user stands behind the working machine 2 and holds an upper portion of the handle unit 8 with both hands and pushes the handle unit 8 forward, the wheels 10 rotate and the body unit 4 moves forward along the ground. Hereinafter, a direction in which the wheels 10 rotate and the body unit 4 moves along the ground will be referred to as a front-rear direction, a direction orthogonal to the ground will be referred to as an up-down direction, and a direction orthogonal to the front-rear direction and the up-down direction will be referred to as a left-right direction.

Figure 2:
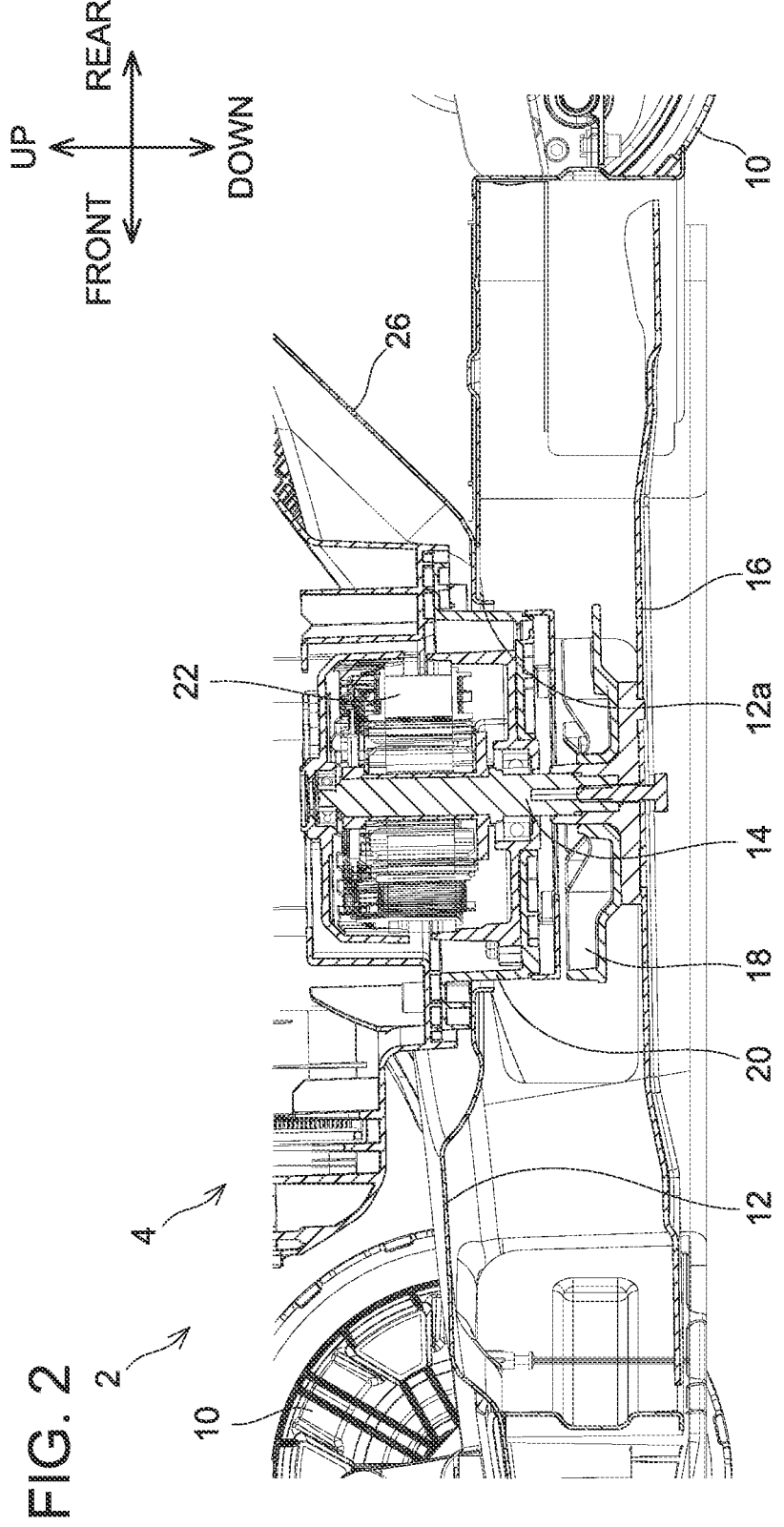
FIG. 2 is a cross-sectional view of vicinity of a cutting blade 16 of the working machine 2 according to the embodiment.

As shown in FIG. 2, the body unit 4 comprises a deck 12, a drive shaft 14, a cutting blade 16, a fan 18, a motor receptacle 20, a motor for cutting blade (cutting blade motor) 22, and an ECU (not shown). A lower surface of the deck 12 has an opening in a substantially cylindrical shape toward the ground. An opening 12a having a substantially circular shape is defined on an upper surface of the deck 12. A space inside the deck 12 communicates with a duct (not shown) that has a port toward a rear side of the body unit 4. When the grass collector unit 6 (see FIG. 1) is attached to the rear end of the deck 12, the space inside the deck 12 communicates with a space inside the grass collector unit 6 via the duct. The drive shaft 14 extends substantially along the up-down direction. The cutting blade 16 and the fan 18 are disposed in the space inside the deck 12. The cutting blade 16 is fixed to a lower end of the drive shaft 14. The cutting blade 16 extends from the drive shaft 14 in a direction substantially orthogonal to the up-down direction. The fan 18 is fixed to the drive shaft 14 at a spot higher than the cutting blade 16. As the drive shaft 14 rotates, the cutting blade 16 rotates, by which grass on the ground is cut. When the drive shaft 14 rotates, the fan 18 rotates by which a flow of air traveling from the opening on the lower surface of the deck 12 toward the duct is generated in the space inside the deck 12. Due to this, the grass cut by the cutting blade 16 is sucked up by the fan 18 and delivered to the grass collector unit 6 via the duct.

The motor receptacle 20 is fixed to the upper surface of the deck 12. The motor receptacle 20 has the cutting blade motor 22 fixed thereto. The cutting blade motor 22 is, for example, a brushless motor. The cutting motor 22 is configured to rotate the drive shaft 14. The ECU includes, for example, an inverter circuit (not shown) including a plurality of switching elements (not shown) and a control circuit (not shown) configured to control operations of the plurality of switching elements. The ECU controls operation of the cutting blade motor 22 by controlling electric power supplied to the cutting blade motor 22 from the first, power supply 28 or the second power supply 30, which are to be described later.

Figure 3:
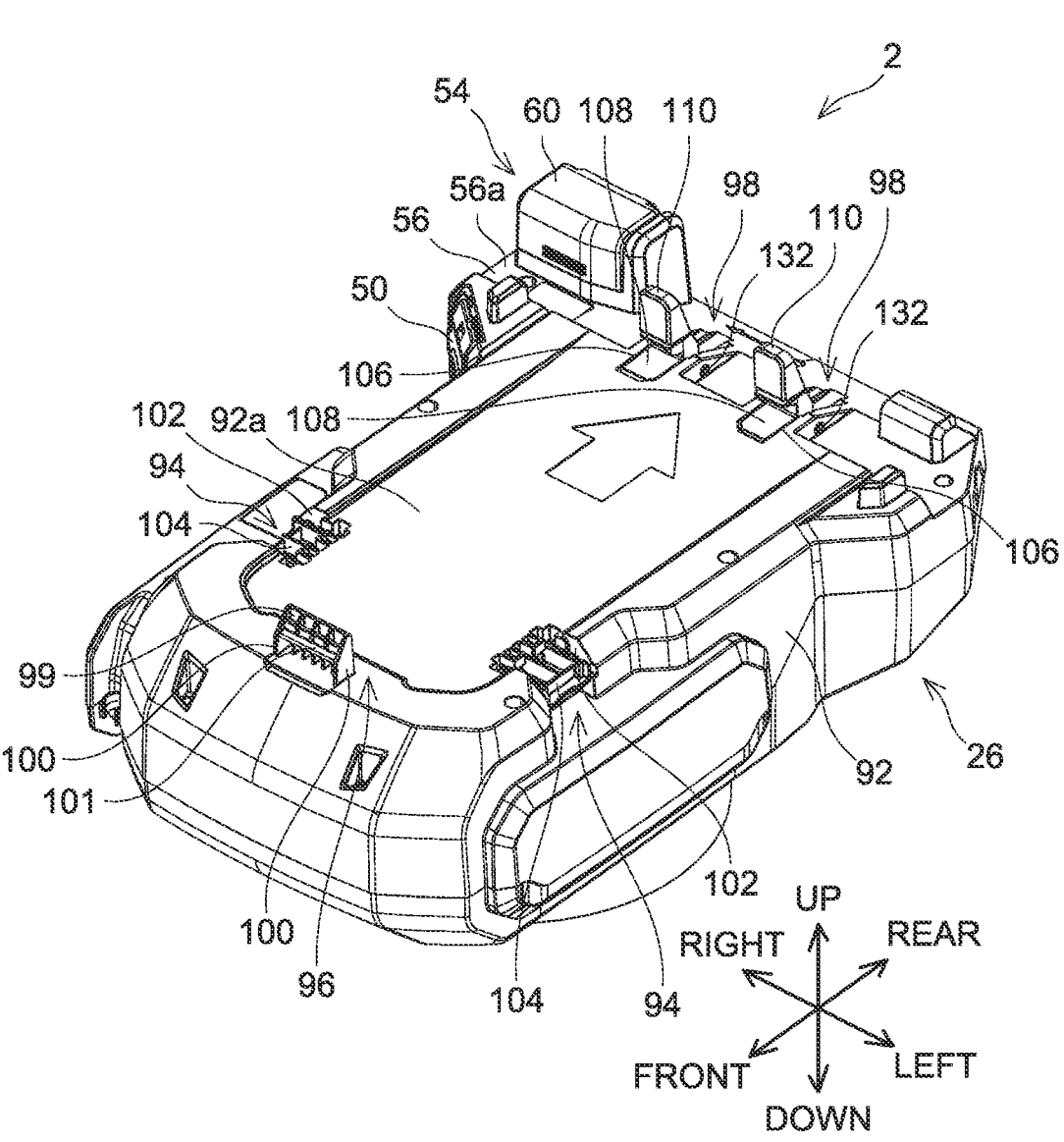
FIG. 3 is a perspective view of a power supply receptacle 26 according to the embodiment.

The working machine 2 further comprises a power supply receptacle 26 shown in FIG. 3. As shown in FIG. 2, the power supply receptacle 26 is fixed to the motor receptacle 20. The power supply receptacle 26 covers the cutting blade motor 22 from above. Either the first power supply 28 (see FIG. 1) or the second power supply 30 (see FIG. 13) can be selectively attached to the power supply receptacle 26. Specifically, when the first power supply 28 is attached to the power supply receptacle 26, the second power supply 30 cannot be attached to the power supply receptacle 26, and when the second power supply 30 is attached to the power supply receptacle 26, the first power supply 28 cannot be attached to the power supply receptacle 26. First, the first power supply 28 wilt be described below.

Figure 4:
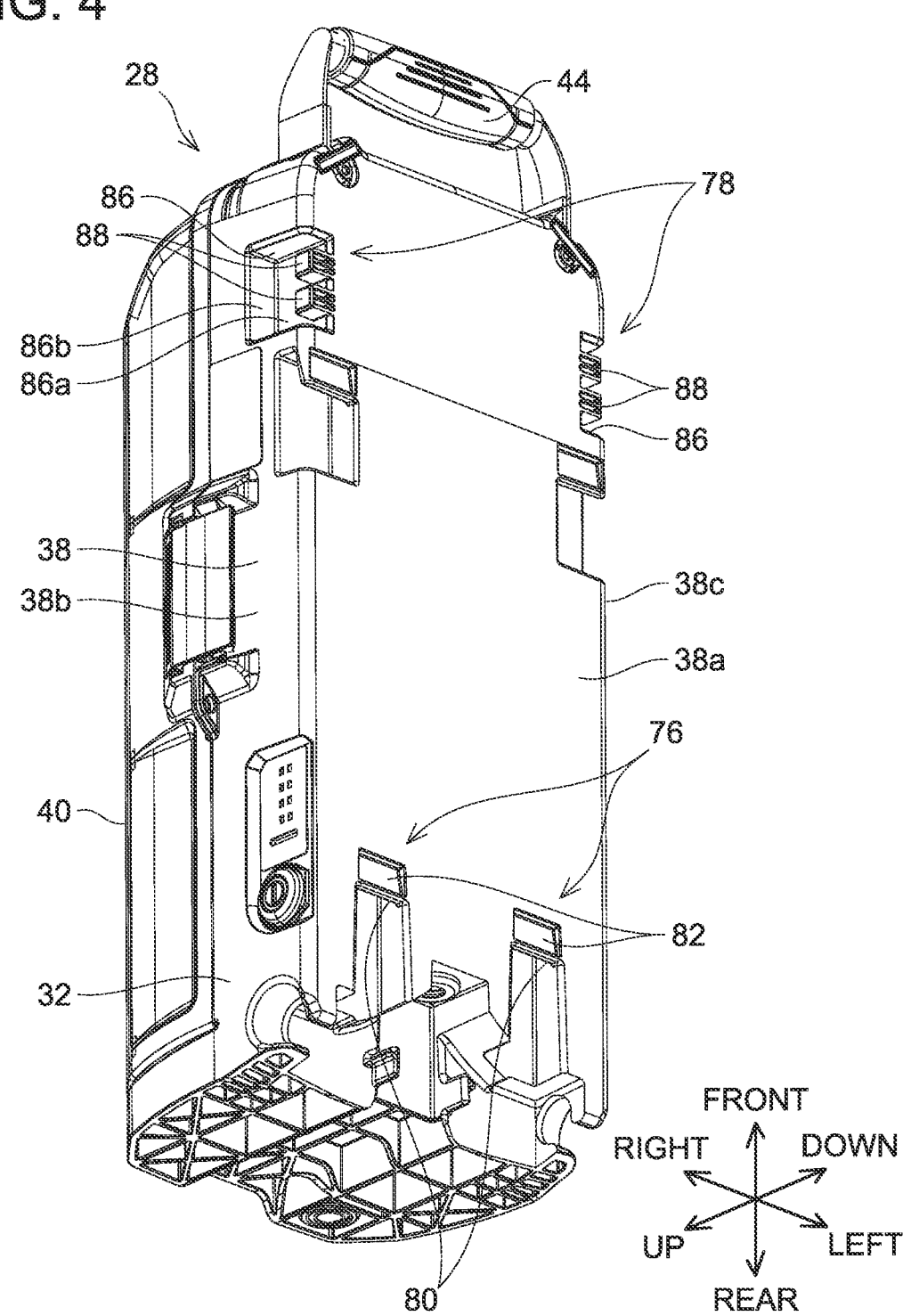
FIG. 4 is a perspective view of the first power supply 28 in a state where a first upper housing 40 according to the embodiment is closed.
Figure 5:
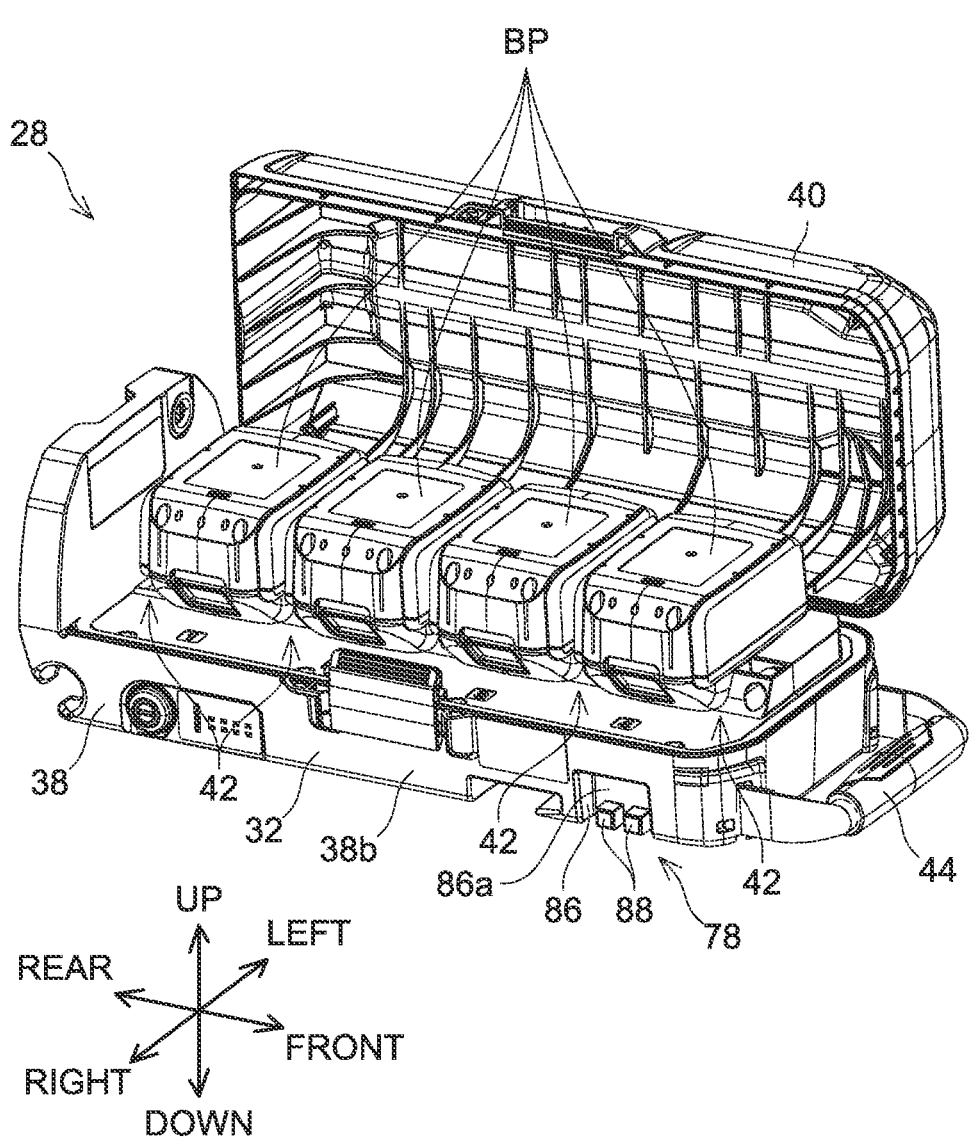
FIG. 5 is a perspective view of the first power supply 28 in a state where the first upper housing 40 of the embodiment is open.

The first power supply 28 shown in FIG. 4 is a part of a backpack battery in which a frame for carrying, on user's back, a shoulder belt, and a waist belt are attached to the first power supply 28. The user can carry the backpack battery by wearing the shoulder belt on the shoulders and the waist belt on the waist. The first power supply 28 comprises a first housing 32, four first battery packs BP (see FIG. 5), a first power cable 34 (see FIG. 1), and a first connector 36 (see FIG. 1). The first housing 32 includes a first lower housing 38 and a first upper housing 40. When the first power supply 28 is attached to the power supply receptacle 26, a lower surface 38a of the first lower housing 38 faces the power supply receptacle 26. As shown in FIG. 5, four battery receptacles 42 are disposed in the first lower housing 38. The first battery pack BP is detachable from/attachable to each battery receptacle 42. A plurality of battery cells (not shown) is accommodated in each first battery pack BP. The battery cells include, for example, lithium ion batteries. Bach first battery pack BP has, for example, a rated voltage of 18 V and a rated capacity of 108 Wh. In a state where the four first battery packs BP are attached to the battery receptacles 42, the rated voltage of the first power supply 28 is 18V or 36V, and the rated capacity is 436 Wh. Due to this, the working machine 2 can be used for long hours by using the first power supply 28. A weight of the first battery pack BP is, for example, 0.6 kg, and in a state where the four first battery packs BP are attached to the battery receptacles 42, a weight of the first power supply 28 is, for example, 7 kg or more. The first upper housing 40 is openably attached to the first lower housing 38. In a state where the first upper housing 40 is opened, the first battery packs BP can be attached to and detached from the battery receptacles 42. On the other hand, in a suite where the first upper housing 40 is closed, lire first battery packs BP are disposed in an internal space defined by the first lower housing 38 and the first upper housing 40. Due to this, the four first battery packs BP are housed inside the first housing 32.

As shown in FIG. 4, a first grip 44 is attached to a front end of the first lower housing 38. The first grip 44 is configured to be gripped by the user. Due to this, the user can easily cam the first power supply 28 by gripping first grip 44.

The first power cable 34 shown in FIG. 1 is configured to discharge power of the first battery packs BP. The first power cable 34 extends from a rear end of the first housing 32. The first power cable 34 is routed along a right surface of the power supply receptacle 26. A guide tor routing (cable hook) 46 is disposed on the right surface of the power supply receptacle 26. The first power cable 34 extends forward and below the routing guide 46, then extends upward on a front side of the routing guide 46, and then extends rearward and above the routing guide 46. Due to this, the first power cable 34 is routed around the routing guide 46, by which the first power cable 34 can be suppressed from loosening.

Figure 6:
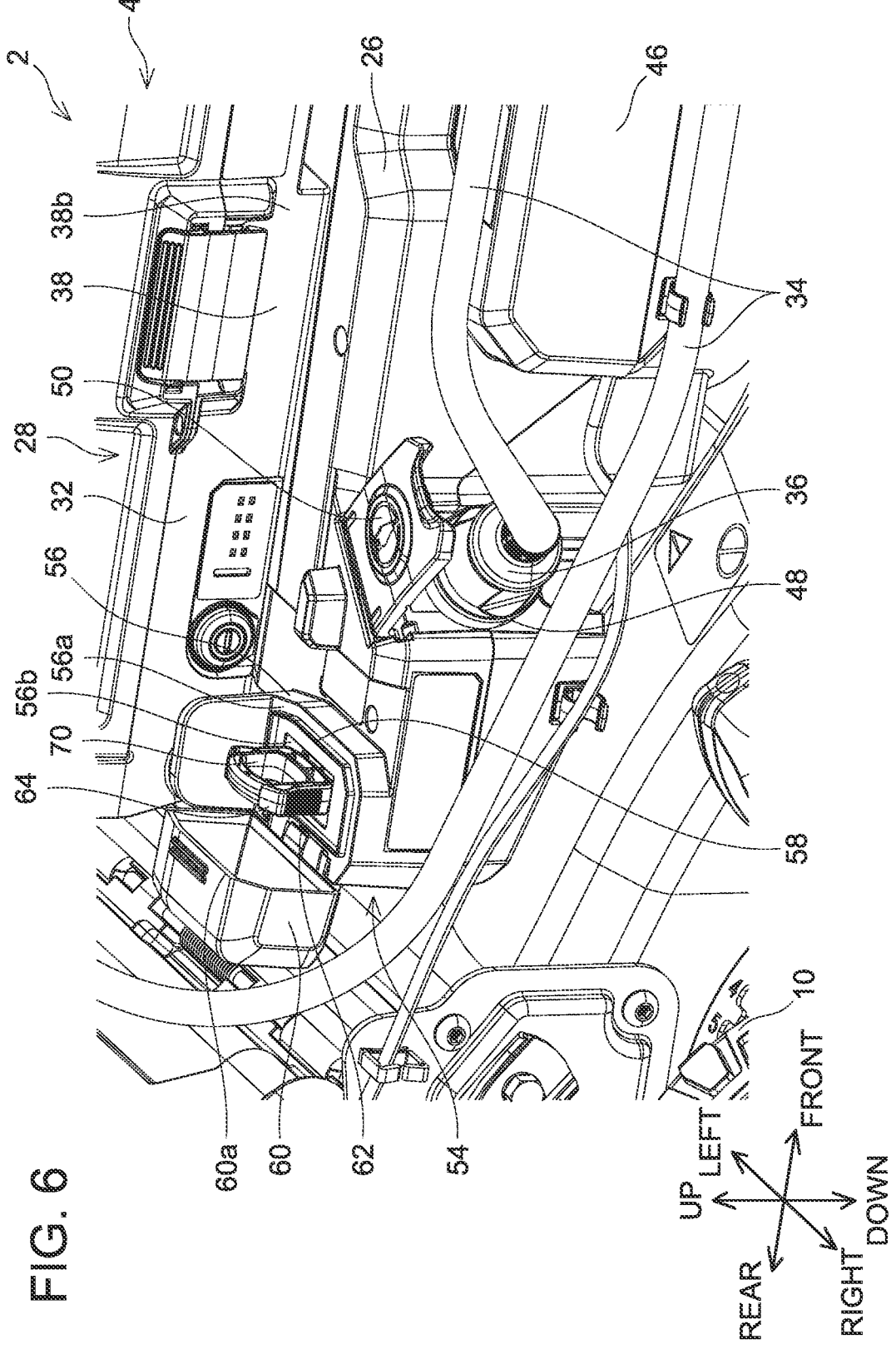
FIG. 6 is a perspective view of vicinity of a connector coupler 48 of the working machine 2 according to the embodiment.
Figure 8:
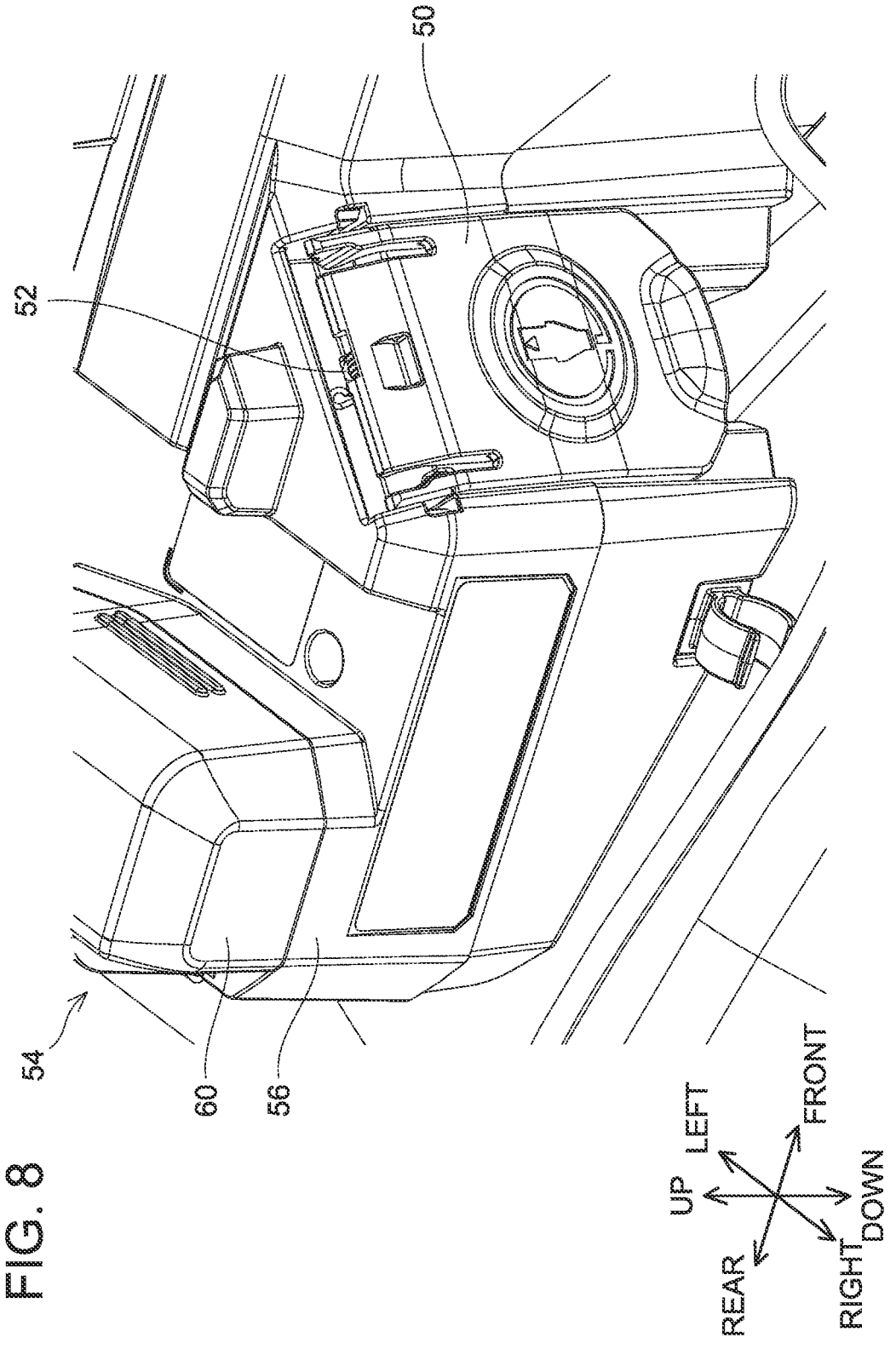
FIG. 8 is a perspective view of vicinity of the key insertion part 54 in a state where a cover 50 according to the embodiment is closed.

As shown in FIG. 6, the first connector 36 is disposed at an end (tip) of the first power cable 34. The first connector 36 is configured to be inserted into the connector coupler 48 disposed on the right surface of the power supply receptacle 26. The connector coupler 48 is disposed behind the routing guide 46. A cover 50 is attached above the connector coupler 48 openably and closably. The cover 50 is biased in a direction of closing the connector coupler 48 by a biasing member 52 (see FIG. 8). In a state where the cover 50 is opened, since the connector coupler 48 is exposed, the first connector 36 can be inserted into the connector coupler 48. When the First connector 36 is inserted into the connector coupler 48, power of the first battery pack BP becomes ready to be supplied to the working machine 2. On the other hand, as shown in FIG. 8, in a state where the cover 50 is closed, since the connector coupler 48 is closed by the cover 50, the first connector 36 cannot be inserted into the connector coupler 48. In addition, in a state where the cover 50 is closed, the cover 50 can suppress liquid from entering the connector coupler 48.

Figure 7:
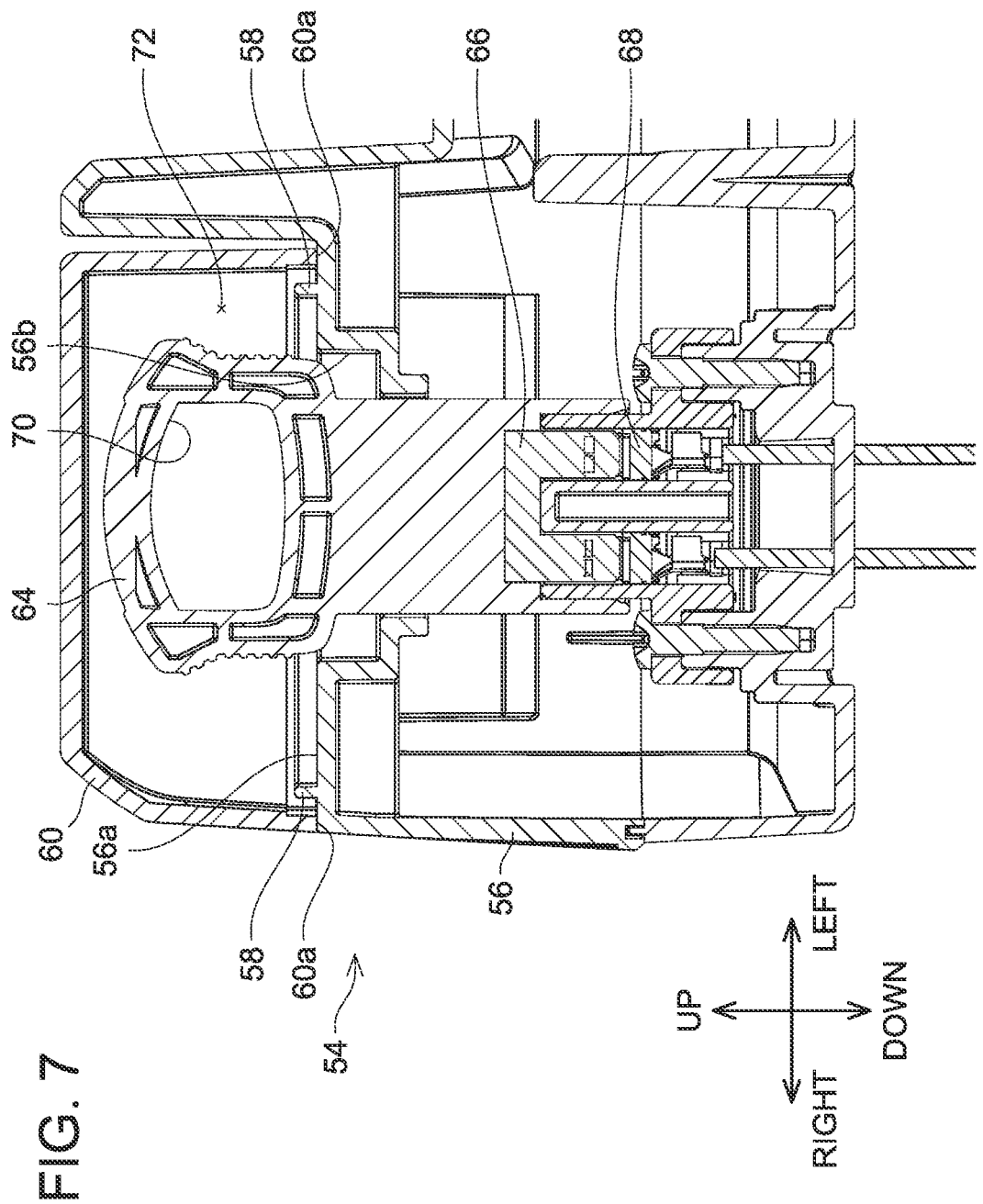
FIG. 7 is a cross-sectional view of a key insertion part 54 according to the embodiment.

As shown in FIG. 6, a key insertion pan 54 is disposed more on the rear side than the connector coupler 48 is. The key insertion part 54 comprises a key insertion base 56, a waterproof wall 58, a lid member 60, and a biasing member 62. The key insertion base 56 has an upper surface 56a orthogonal to the up-down direction and a key insertion port 56b arranged on the upper surface 56a. The upper surface 56a is disposed more on the upper side than (higher than) the connector coupler 48 is. As shown in FIG. 7, a lock-off key 64 can be inserted into the key insertion port 56b along the up-down direction. When the lock-off key 64 is inserted into the key insertion port 56b in a state where the first connector 36 is inserted into the connector coupler 48, a conduction plate 66 disposed below lire lock-off key 64 comes into contact with a conduction part 68 disposed inside the power supply receptacle 26. The conduction part 68 is disposed between the first battery packs BP and the cutting blade motor 22 in an electric circuit. Due to this, the first battery packs BP and the cutting blade motor 22 are electrically connected to each other. The cutting blade motor 22 can thus be driven by the electric power supplied from the first battery packs BP. On the other hand, when the lock-off key 64 is removed from the key insertion port 56b in the state where the first connector 36 is inserted into the connector coupler 48, the conduction plate 66 does not contact the conduction part 68 anymore (i.e. separates from the conduction plate 66). Due to this, the first battery packs BP and the cutting blade motor 22 are electrically disconnected from each other. Due to this, the power from the first battery packs BP is not supplied to the cutting blade motor 22, and the cutting blade motor 22 cannot be driven. Furthermore, the configuration using the lock-off key 64 may not be limited to the configuration of the present embodiment, but may also be applicable to a case where another power supply source is used, for example, a case where the first battery packs BP are directly mounted to the power supply receptacle 26, a case where power is supplied from an external power supply to the working machine 2 via a power cable, or the like.

The lock-off key 64 has a know port 70 on its upper portion. The knob port 70 penetrates the lock-off key 64 in its thickness direction. In a state where the lock-off key 64 is inserted into the key insertion port 56b, the knob port 70 is located more on the upper side than (higher than) the upper surface 56a. By inserting a finger into the knob port 70, the user can easily pull out the lock-off key 64 upward from the key insertion port 56b.

As shown in FIG. 6, the waterproof wall 58 protrudes upward from the upper surface 56a. The waterproof wall 58 surrounds the key insertion port 56b. Due to this, even when liquid is present on the upper surface 56a outside the key insertion port 56b, entry of the liquid into the key insertion port 56b can be suppressed.

The lid member 60 is attached to the key insertion base 56 so as to be openable and closable more on the rear side than the key insertion port 56b and the waterproof wall 58. The lid member 60 is biased in a closing direction (that is, direction in which an abutting surface 60a of the lid member 60 approaches to face an upper surface 56a of the key insertion base 56) by the biasing member 62. As shown in FIG. 7, in a state where the lid member 60 is closed, a closed space 72 is defined by the lid member 60 and the upper surface 56a. The lock-off key 64 inserted into the key insertion port 56b and the waterproof wall 58 are disposed in the closed space 72. In the state where the lid member 60 is closed, the abutting surface 60a abuts on the upper surface 56a so as to surround the waterproof wall 58. Due to this, in the state where the lid member 60 is closed, entry of liquid into the closed space 72 can be suppressed.

Figure 9:
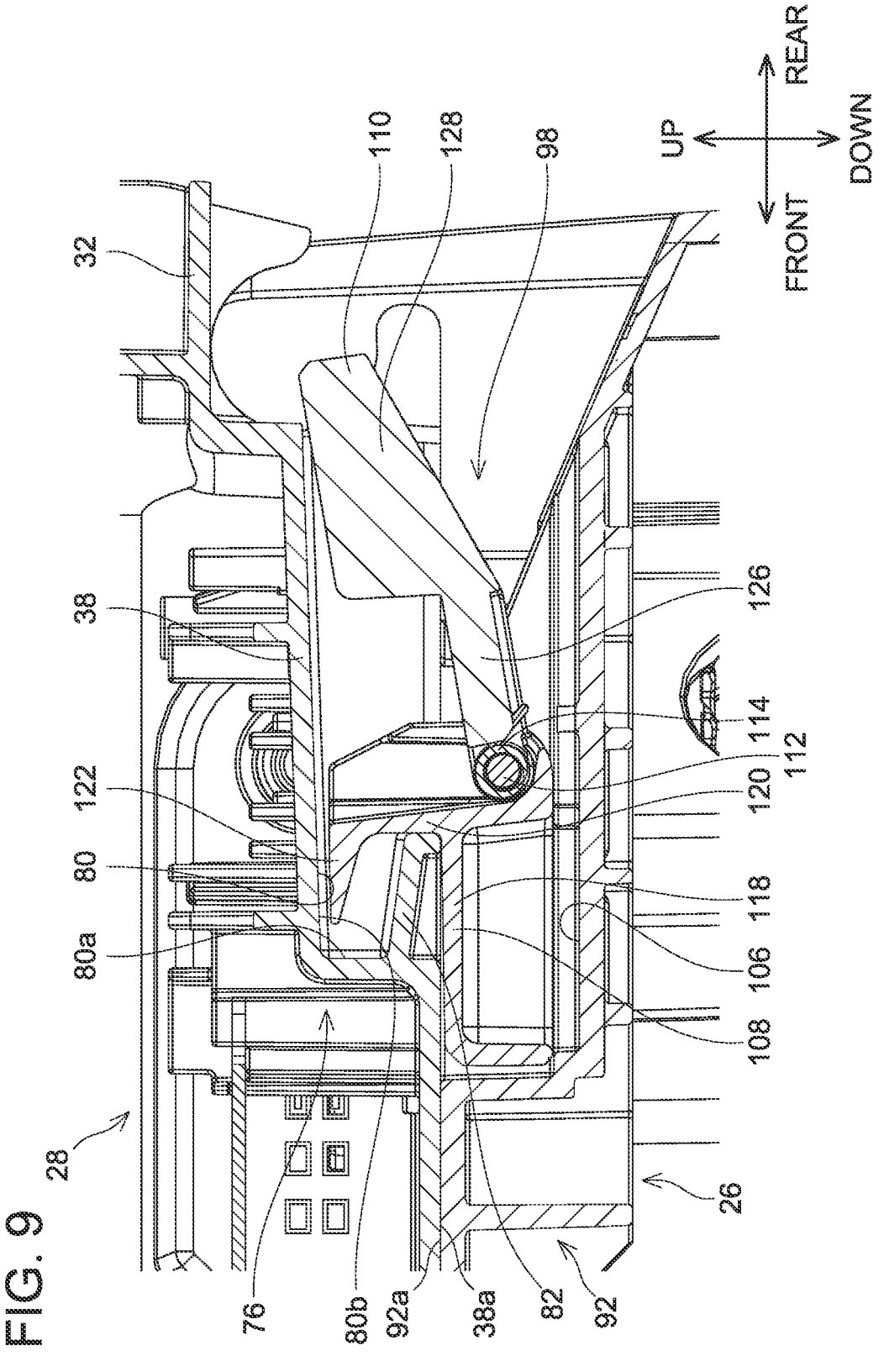
FIG. 9 is a cross-sectional view of vicinity of a third machine-side engagement part 98 in a state where the first power supply 28 of the embodiment is attached to a power supply receptacle 26.

As shown in FIG. 4, the first power supply 28 further includes two first common engagement parts 76 and two first specific engagement parts 78. The two first common engagement pans 76 are disposed at a rear portion of the lower surface 38a of the first lower housing 38. The two first common engagement parts 76 are arranged side by side in the left-right direction. Each first common engagement part 76 includes an engagement recess 80 and a first common engagement pawl 82. The engagement recess 80 is recessed upward from the rear portion of the lower surface 38a of the first lower housing 38. As shown in FIG. 9, the first common engagement pawl 82 is separated from a bottom surface 80b of the engagement recess 80. The first common engagement pawl 82 extends rearward from a side surface 80a of the engagement recess 80. The first common engagement pawl 82 is inclined downward from the side surface 80a. Due to this, the engagement recess 80 opens rearward.

Figure 10:
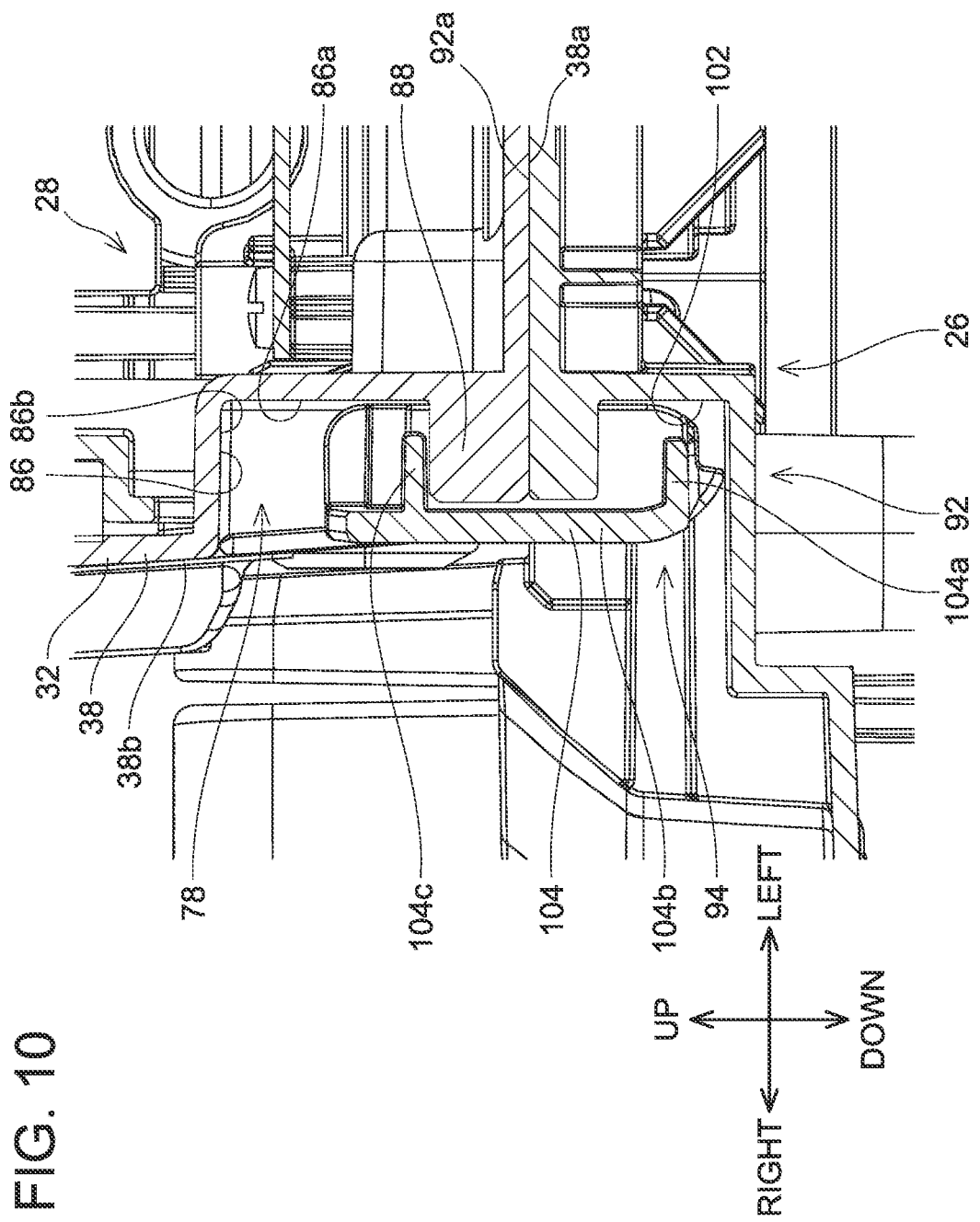
FIG. 10 is a cross-sectional view of vicinity of a first machine-side engagement part 94 in a state where the first power supply 28 of the embodiment is attached to the power supply receptacle 26.

As shown in FIG. 4, the two first specific engagement parts 78 are arranged on the lower surface 38a of the first lower housing 38. The two first specific engagement parts 78 are disposed more on the front side than the two first common engagement parts 76 are. The two first specific engagement parts 78 are arranged side by side in the left-right direction. Each first specific engagement part 78 includes an engagement recess 86 and two first specific engagement pawls 88. The engagement recess 86 is recessed upward from vicinity of the front end of the lower surface 38a of the first lower housing 38. One of the engagement recesses 86 is connected to a right surface 38b of die first lower housing 38, and the oilier of the engagement recesses 86 is connected to a left surface 38c of the first lower housing 38. As shown in FIG. 10, the first specific engagement pawls 88 are connected to a side surface 86a of the engagement recess 86 and extend in a direction separating away from the side surface 86a. The first specific engagement pawls 88 are disposed apart from a bottom surface 86b of the engagement recess 86.

Next, the power supply receptacle 26 shown in FIG. 3 will be described. The power supply receptacle 26 comprises a base member 92, two first machine-side engagement parts 94, a second machine-side engagement part 96, and two third machine-side engagement parts 98. The base member 92 has a reference surface 92a The reference surface 92a faces upward. When the first power supply 28 is attached to the power supply receptacle 26, the reference surface 92a faces the lower surface 38a of the first lower housing 38.

The two first machine-side engagement parts 94, the second machine-side engagement part 96, and the two third machine-side engagement parts 98 are disposed on the reference surface 92a. The two first machine-side engagement parts 94 are arranged side by side in the left-right direction. Each first machine-side engagement part 94 comprises a machine-side engagement recess 102 and a first machine-side engagement pawl 104. The machine-side engagement recess 102 is recessed downward from the reference surface 92a. One of the machine-side engagement recesses 102 is connected to a right surface of the base member 92, and the other of the machine-side engagement recesses 102 is connected to a left surface of the base member 92. Each first machine-side engagement pawl 104 is swingably attached to the base member 92. As shown in FIG. 10, each first machine-side engagement pawl 104 includes a swing shaft 104a, a holding part 104b, and a pawl part 104c. The swing shaft 104a extends in the front-rear direction. The swing shaft 104a is attached to the base member 92 in the machine-side engagement recess 102. The holding part 104b is connected to the swing shaft 104a. The holding part 104b is held when the user operates the first machine-side engagement pawl 104. By holding and directly operating the holding part 104b, the user can cause the first machine-side engagement pawl 104 to swing around the swing shaft 104a extending in the front-rear direction. The pawl part 104c extends from the holding part 104b in a direction substantially orthogonal to the holding part 104b. The pawl part 104c is disposed apart from the swing shaft 104a.

As shown in FIG. 3, the second machine-side engagement part 96 is disposed more on the front side than the two first machine-side engagement parts 94 are. In the left-right direction, the second machine-side engagement part 96 is disposed near a center of the base member 92. The second machine-side engagement part 96 comprises a rear wall 99, two side walls 100, and a horizontal wall 101. The rear wall 99 extends upward from the reference surface 92a. An upper surface of the rear watt 99 is inclined frontward and downward (see FIG. 17). The two side walls 100 extend upward from the reference surface 92a. One of the side walls 100 is connected to a right end of the rear wall 99, and the other of the side walls 100 is connected to a left end of the rear wall 99. The two side walls 100 extend to a spot more frontward than the rear wall 99. The horizontal wall 101 extends frontward from a front surface of the rear wall 99. In the up-down direction, the horizontal wall 101 is connected to the rear wall 99 in vicinity of a center of the rear wall 99 (see FIG. 17). A rigid end of the horizontal wall 101 is connected to the one side wall 100, and a left end of the horizontal watt 101 is connected to the other side wall 100.

Figure 11:
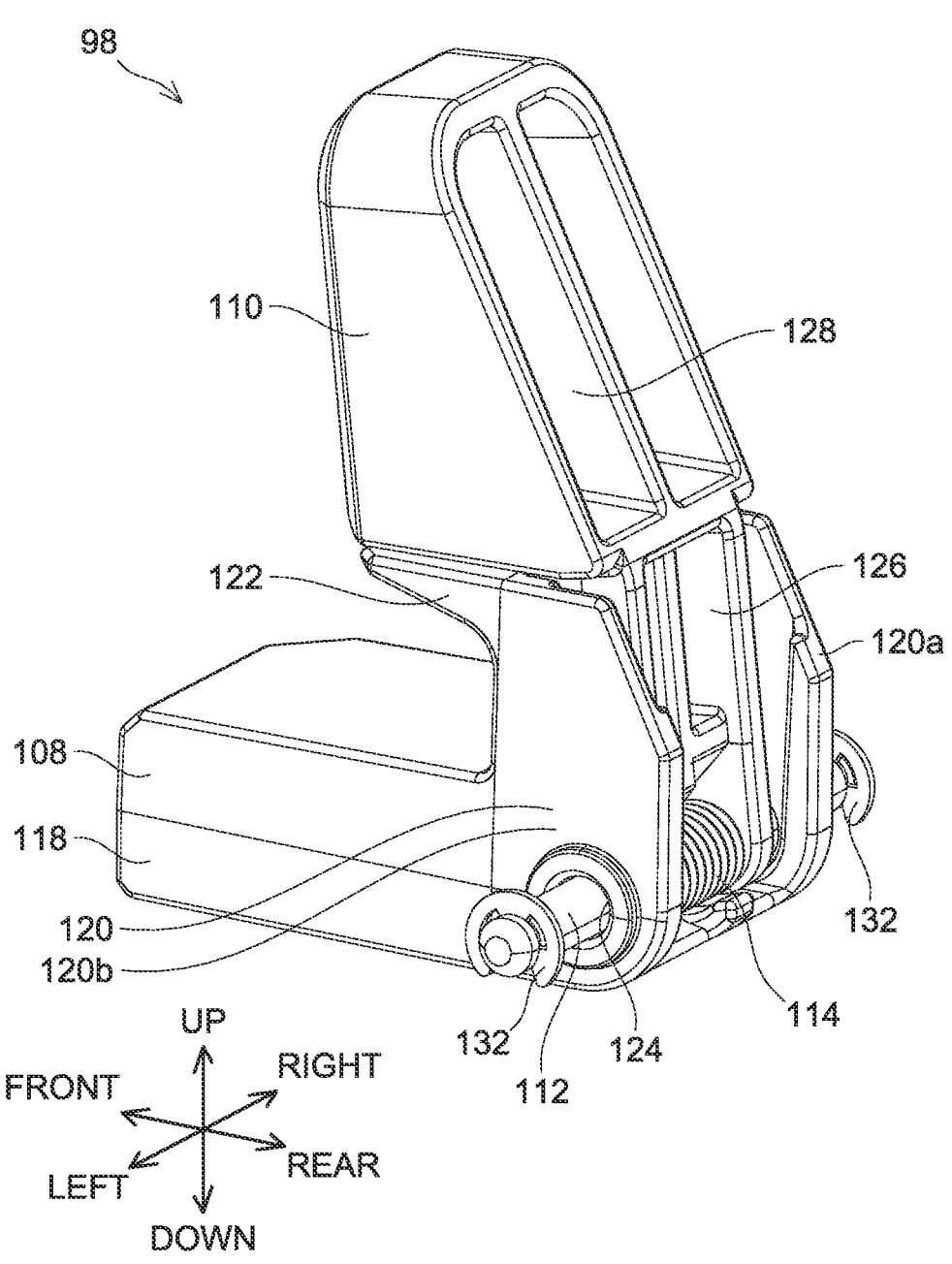
FIG. 11 is a perspective view of the third machine-side engagement part 98 according to the embodiment.

The two third machine-side engagement parts 98 are disposed more on the rear side titan the two first machine-side engagement parts 94 and the second machine-side engagement part 96. The two third machine-side engagement parts 98 are arranged side by aide in the left-right direction. Bach third machine-side engagement part 98 comprises a machine-side engagement recess 106, an engagement member 108, an auxiliary member 110, a swing shaft 112 (see FIG. 11), and a biasing member 114 (see FIG. 11). The machine-side engagement recess 106 is recessed downward from the reference surface 92a. As shown in FIG. 3, the engagement member 108 protrudes upward from the reference surface 92a. The engagement member 108 is constituted of, for example, a metal material or a resin material. As shown in FIG. 11, the engagement member 108 comprises a lower engagement part 118, a rear engagement part 120, and an upper engagement pan 122. FIG. 11 illustrates postures of the engagement member 108, the auxiliary member 110, the swing shaft 112, and the biasing member 114 when located at an initial position. The lower engagement part 118 extends in the front-rear direction. The rear engagement part 120 is connected to a rear end of the lower engagement part 118. The rear engagement part 120 extends in the up-down direction. An upper end of the rear engagement part 120 is disposed more on the upper side titan (higher than) an upper end of the lower engagement part 118. An insertion bole 124 penetrating the rear engagement part 120 in the left-right direction is defined in a rear lower part of the mar engagement part 120. The upper engagement, part 122 extends frontward from an upper part of a front surface of the rear engagement part 120. The upper engagement part 122 gradually becomes thinner toward the front side. As shown in FIG. 9, when the engagement member 108 is located at the initial position, the upper engagement part 122 and an upper half of the rear engagement part 120 protrude upward from the reference surface 92a.

As shown in FIG. 3, the auxiliary members 110 protrude upward from the reference surface 92a. Each auxiliary member 110 is made of, for example, a metal material or a resin material. A strength of the auxiliary members 110 is lower than a strength of the engagement members 108. As shown in FIG. 11, each auxiliary member 110 comprises a lower auxiliary part 126 and an upper auxiliary part 128. The lower auxiliary part 126 is disposed between a right wall 120a and a left wall 120b of the rear engagement pan 120. The lower auxiliary part 126 extends upward. An upper end of the lower auxiliary part 126 is disposed slightly more on the upper side than (higher than) the upper end of the rear engagement part 120. The upper auxiliary part 128 extends frontward front the upper end of the lower auxiliary part 126. A length of the upper auxiliary part 128 in the up-down direction gradually increases from the upper end of the lower auxiliary part 126 toward the front side, and then ends up being constant. Although not shown, when the auxiliary member 110 is located at the initial position, the upper auxiliary part 128 and an upper half of the lower auxiliary part 126 protrude upward from the reference surface 92a.

The swing shaft 112 is inserted into the insertion hole 124 defined in the rear engagement part 120 and an insertion hole (not shown) defined in the lower auxiliary part 126. Due to this, the engagement member 108 and the auxiliary member 110 are swingably supported by the base member 92 via the swing shaft 112. The engagement member 108 is movable relative to the auxiliary member 110. As shown in FIG. 9, the swing shaft 112 is attached to the base member 92 in the machine-side engagement recess 106, and both ends of the swing shall 112 protrude outward from the base member 92. Retainer members 132 (see FIG. 11) are attached to both ends of the swing shaft 112, respectively. The retainer members 132 suppress detachment of the swing shaft 112 from the base member 92.

As shown in FIG. 11, the biasing member 114 is, for example, a torsion spring. The biasing member 114 has the swing shaft 112 inserted therethrough. The biasing member 114 biases the auxiliary member 110 toward the initial position. When the lower auxiliary part 126 is in contact, with the rear engagement part 120, the engagement member 108 is biased toward the initial position by biasing force of the biasing member 114.

Figure 12:
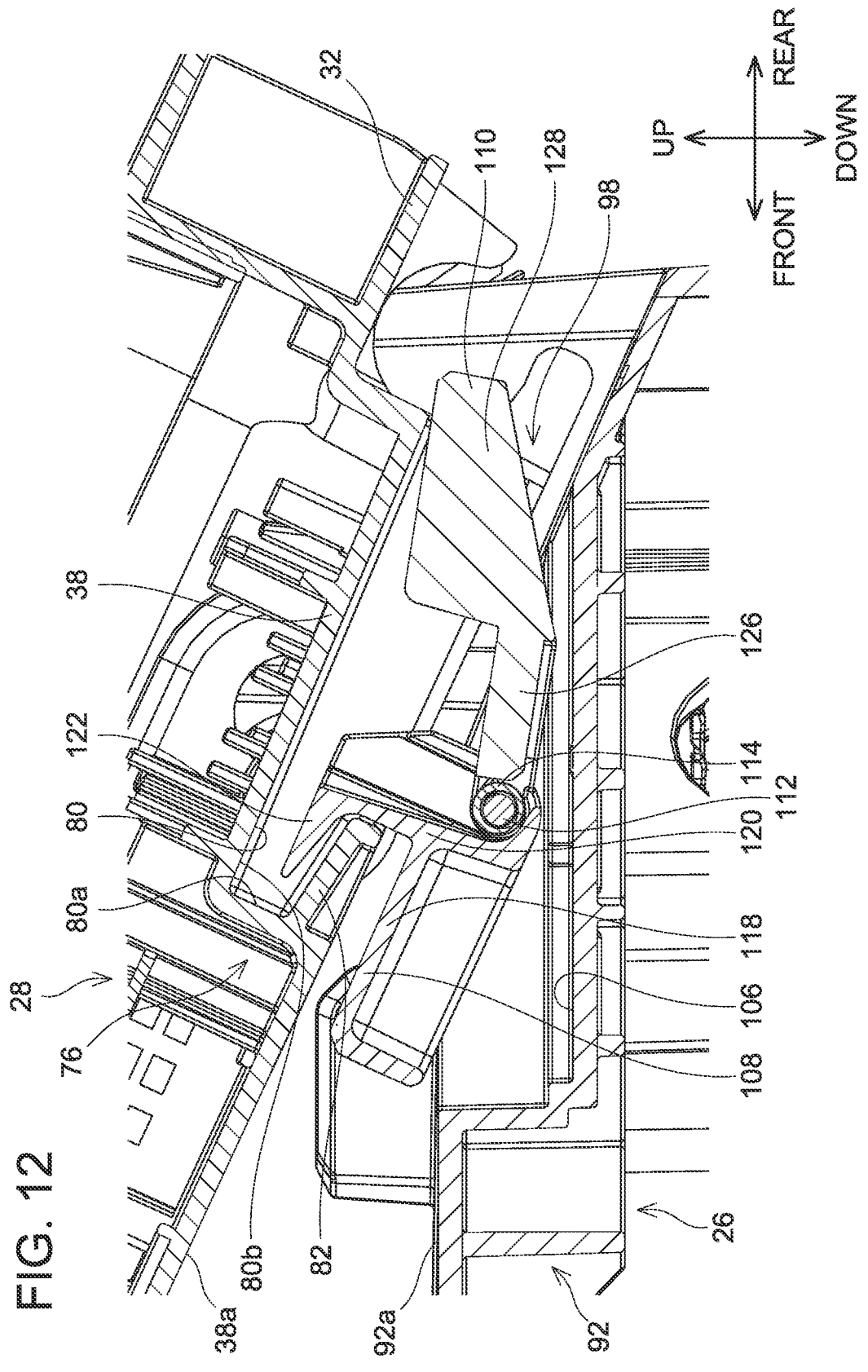
FIG. 12 is a cross-sectional view of the vicinity of the third machine-side engagement part 98 when the first power supply 28 according to the embodiment is attached to the power supply receptacle 26.

Next, an operation of attaching the first power supply 28 to the power supply receptacle 26 will be described. The user inserts die first common engagement pawls 82 into corresponding spaces between the lower engagement part 118 and the upper engagement part 122 of each of the engagement members 108 in a state where the first power supply 28 is tilted with respect to the reference surface 92a of the base member 92. Due to this, without the engagement members 108 being directly operated by the user, the upper engagement parts 122 are inserted into the engagement recesses 80 of the first common engagement parts 76, by which the first common engagement parts 76 are engaged with the third machine-side engagement parts 98. As shown in FIG. 12, when the first common engagement pawls 82 abut on the rear engagement parts 120 of the engagement members 108, the engagement members 108 swing rearward around the swing shafts 112, and take postures inclined with respect to the reference surface 92a. In addition, the upper auxiliary parts 128 of the auxiliary members 110 abut on the first lower housing 38 of the first power supply 28 and swing rearward around the swing shafts 112, without being directly operated by the user.

Next, the user lays down the first power supply 28 in the tilted state toward the reference surface 92a to bring the lower surface 38a of the first lower housing 38 into contact with the reference surface 92a. As shown in FIG. 9, the upper surfaces of the lower engagement parts 118 and the upper surfaces of the upper engagement parts 122 abut on the first lower housing 38, swing forward around the swing shafts 112, and return to the initial positions. On the other hand, the auxiliary members 110 swing frontward while being in contact with the first lower housing 38 by the biasing force of the biasing members 114, but does not return to the initial positions shown in FIG. 3.

Next, the user directly operates the holding parts 104b of the first machine-side engagement pawls 104 to cause the first machine-side engagement pawls 104 to swing in a direction going toward the first lower housing 38. Thereafter, as shown in FIG. 10, the user causes the pawl parts 104c of the first machine-side engagement pawls 104 to engage with the first specific engagement pawls 88. Due to this, the first power supply 28 is fixed and attached to the power supply receptacle 26 without the lower surface 38a of the first lower housing 38 floating from the reference surface 92a.

When the first power supply 28 is to fie removed from the power supply receptacle 26, the user directly operates the holding parts 104b of the first machine-side engagement pawls 104 to cause the first machine-side engagement pawls 104 to swing in a direction separating away from the first lower housing 38. Thereafter, the user tilts the first power supply 28 in a direction separating away from the reference surface 92a, and pulls out the upper engagement parts 122 from the engagement recesses 80. Due to this, the engagements between the first common engagement parts 76 and the third machine-side engagement parts 98 are released without the engagement members 108 and the auxiliary members 110 being directly operated by the user. Further, the auxiliary members 110 swing frontward by the biasing force of the biasing members 114. When the auxiliary members 110 abut on the engagement members 108, both the engagement members 108 and the auxiliary members 110 swing frontward by the biasing force of the biasing members 114 and return to the initial positions shown in FIG. 3.

Figure 13:
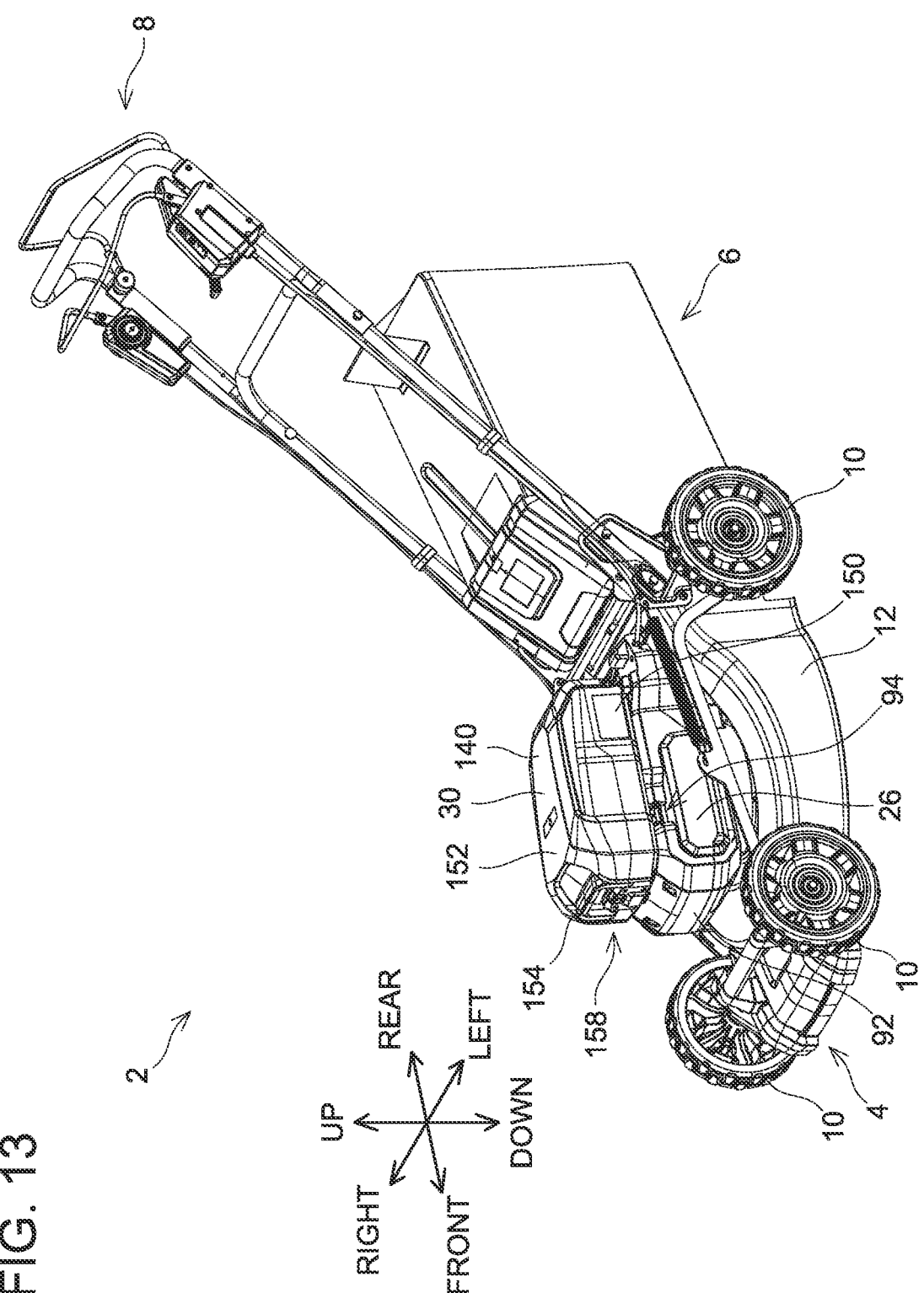
FIG. 13 is a perspective view of the working machine 2 to which a second power supply 30 according to the embodiment is attached.
Figure 14:
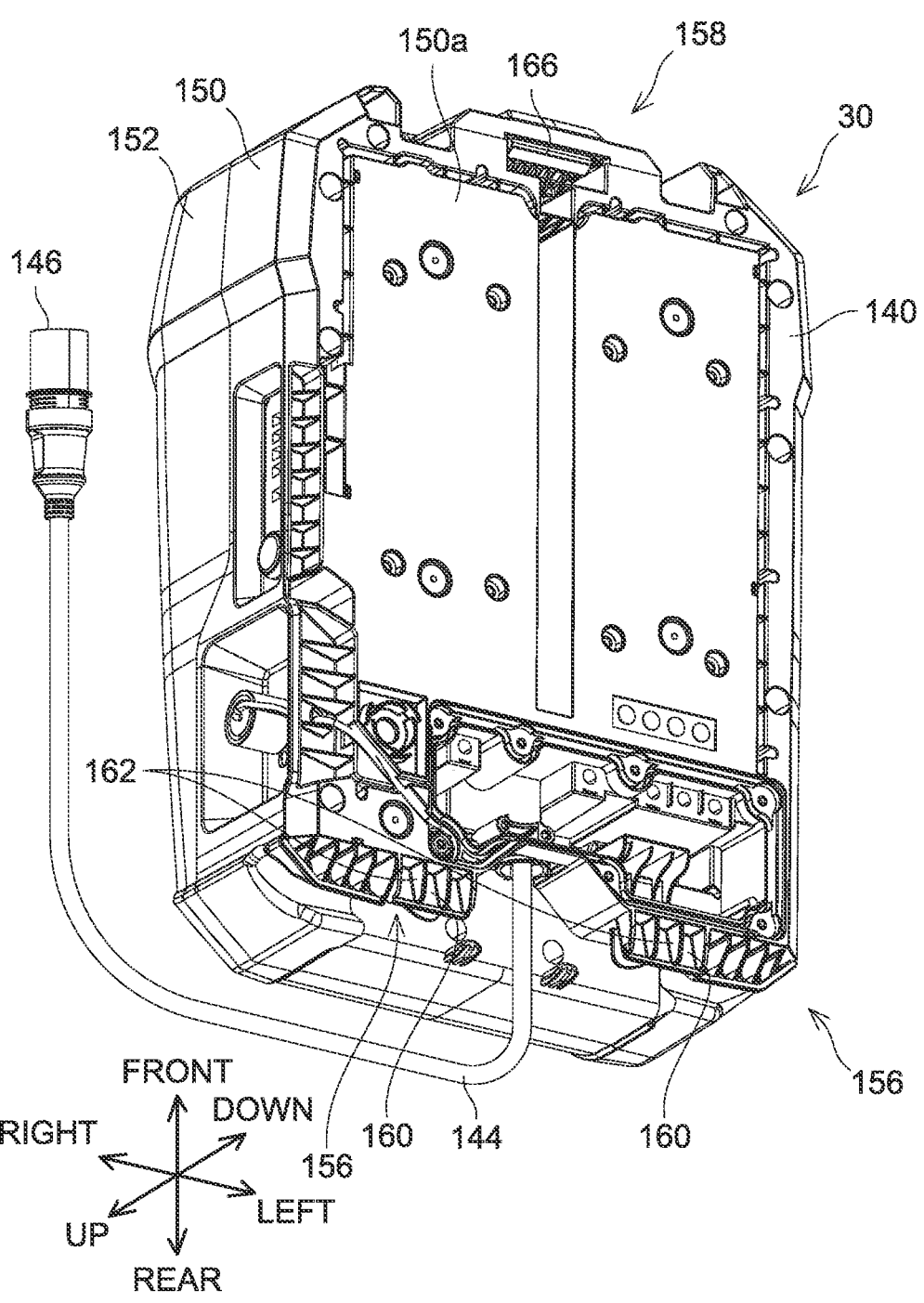
FIG. 14 is a perspective view of the second power supply 30 according to the embodiment.

Next, the second power supply 30 will be described. As shown in FIG. 13, the second power supply 30 is attachable to the power supply receptacle 26. The second power supply 30 is a part, of a backpack battery m which a frame for carrying on user's back, a shoulder belt, and a waist belt are attached to the second power supply 30. A weight of the second power supply 30 is, for example, 7 kg or more. As shown in FIG. 14, the second power supply 30 comprises a second housing 140, two cell holders 142 (see FIG. 15), a second power cable 144, and a second connector 146. A shape of the second housing 140 is different from the shape of the first housing 32. The second housing 140 comprises a second lower housing 150 and a second upper housing 152. When the second power supply 30 is attached to the power supply receptacle 26, a lower surface 150a of the second lower housing 150 faces the reference surface 92a of the base member 92. The second lower housing 150 is fixed to the second upper housing 152 using, screws (not shown).

Figure 15:
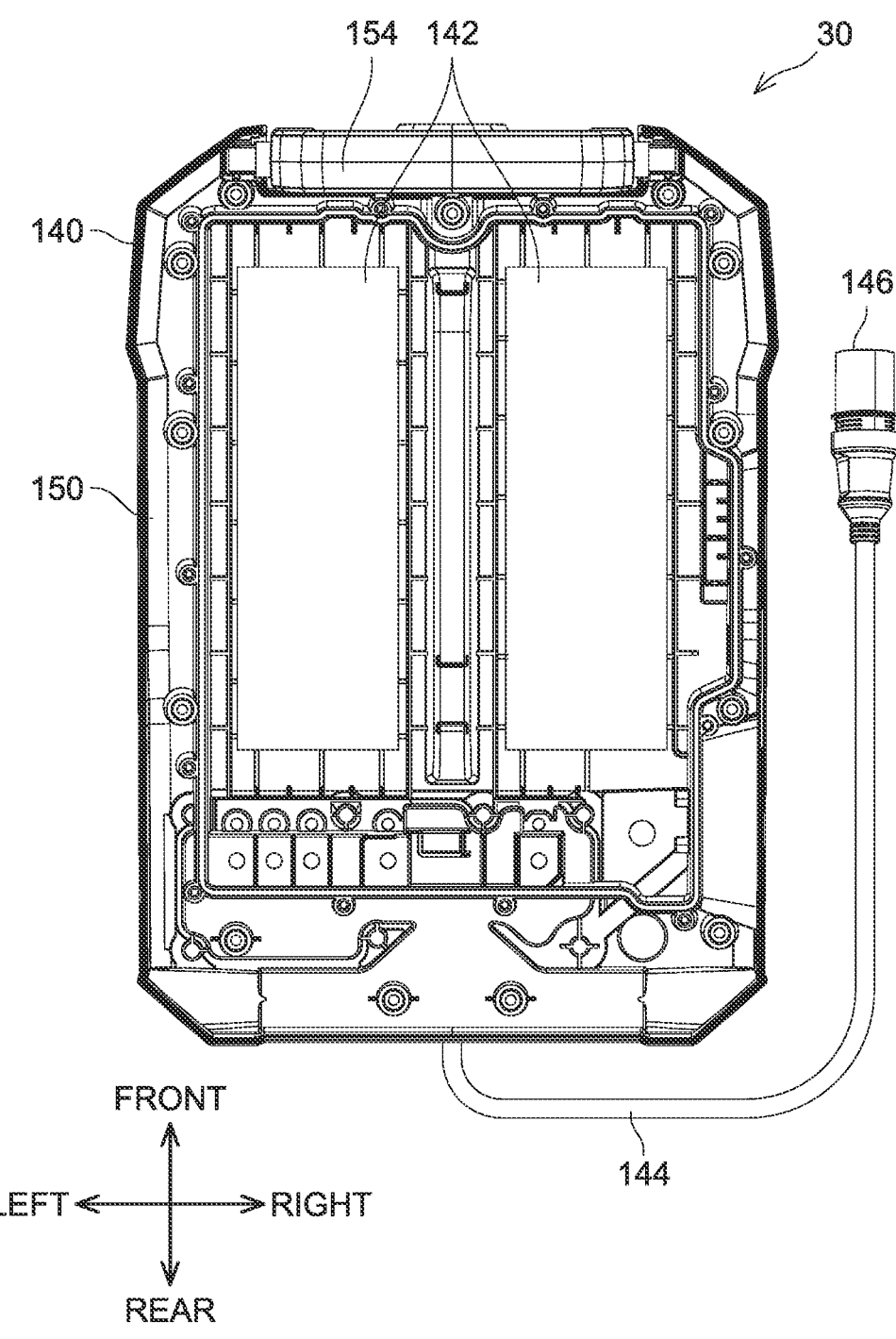
FIG. 15 is a top view of the second power supply 30 in a state where a second upper housing 152 according to the embodiment is removed.

As shown in FIG. 15, a second grip 154 is swingably attached to a front end of the second lower housing 150. The second grip 154 is gripped by the user in a raised state. Doe to this, the user can easily carry the second power supply 30 by gripping the second grip 154.

The two cell holders 142 are housed inside the second housing 140. In FIG. 15, the second upper housing 152 is removed to facilitate understanding of a positional relationship between the two cell holders 142. The two cell holders 142 are arranged side by side in the left-right direction. The ceil holders 142 house a plurality of battery cells (not shown). The battery ceils include, for example, lithium ion batteries. A rated voltage of the second power supply 30 is, for example, 18V or 36V, and a rated capacity is 416 Wh. Due to this, the working machine 2 can be used for long hours by using the second power supply 30.

The second power cable 144 is configured to discharge power of the cell holder 142. The second power cable 144 extends from a rear end of the second housing 140. Although not shown, since the second power cable 144 is shorter than the first power cable 34, in a state where the second power supply 30 is attached to the power supply receptacle 26, the second power cable 144 is not routed around the muting guide 46 (see FIG. 1) arranged on the right surface of the power supply receptacle 26.

The second connector 146 is disposed at an end (tip) of the second power cable 144. The second connector 146 is insertable (out be plugged) into the connector coupler 48 (see FIG. 6) disposed on the right surface of the power supply receptacle 26.

As shown in FIG. 14, the second power supply 30 further includes two second common engagement parts 156 and a second specific engagement part 158. The two second common engagement parts 156 are disposed at a rear pair of the lower surface 150*a* of the second lower housing 150. Each second common engagement pan 156 includes a second common engagement pawl 160 and a plurality of reinforcing members 162. As shown in HG 16, each second common engagement pawl 160 extends rearward from the rear part of the second lower housing 150. The second common engagement pawl 160 is inclined downward from the rear pan of the second lower housing 150. Each of the reinforcing members 162 is connected to the rear pan of the second lower housing 150 and a lower surface of its second common engagement pawl 160. The pluralities of reinforcing members 162 prevent the respective second common engagement pawls 160 from being damaged, for example when external force in the up-down direction is applied to the second common engagement pawls 160.

Figure 17:
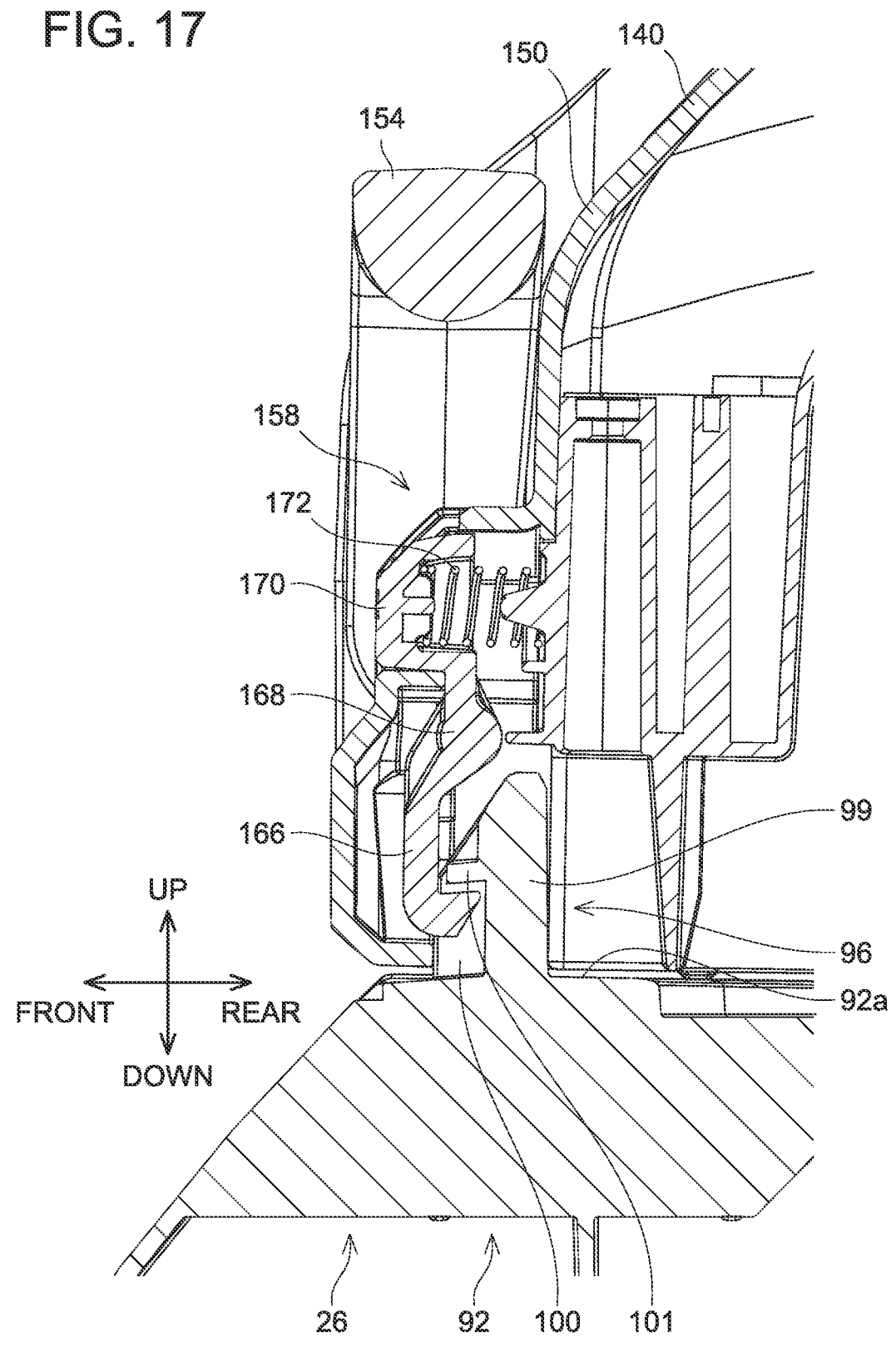
FIG. 17 is a cross-sectional view of vicinity of a second machine-side engagement part 96 in a state where die second power supply 30 according to the embodiment is attached to the power supply receptacle 26.

As shown in FIG. 14, the second specific engagement part 158 is disposed at a front end of the second lower housing 150. The second specific engagement part 158 is disposed more on the front side than the two second common engagement pans 156 arc. As shown in FIG. 17, the second specific engagement part 158 includes a second specific engagement pawl 166, a swing shaft 168, an operation member 170, and a biasing member 172. The second specific engagement pawl 166 extends frontward and downward from the swing shaft 168 extending in the left-right direction, is then bent and extends downward, and is further bent and extends rearward. The swing shaft 168 extends along the left-right direction and is attached to the second lower housing 150. The operation member 170 is connected to an upper end of the swing shaft 168. The operation member 170 is biased toward its initial position by the biasing member 172. The operation member 170 is exposed from the second lower housing 150. Thus, the operation member 170 can be operated by the user.

Next, an operation of attaching the second power supply 30 to the power supply receptacle 26 will be described. The user inserts the second common engagement pawls 160 shown in FIG. 14 into corresponding spaces between the lower engagement part 118 and the upper engagement part 122 of each of the engagement members 108 in a state where the second power supply 30 is tilted with respect to the reference surface 92*a* of the base member 92. Due to this, the second common engagement parts 156 are engaged with the third machine-side engagement parts 98, respectively. When the second common engagement pawls 160 abut on the rear engagement parts 120 of the engagement members 108, similarly to when the first power supply 28 is attached to the power supply receptacle 26, the engagement members 108 swing rearward around the swing shafts 112 and take inclined postures with respect to the reference surface 92*a*. The auxiliary members 110 abut on the second lower housing 150 and swing backward around the swing shafts 112.

Figure 16:
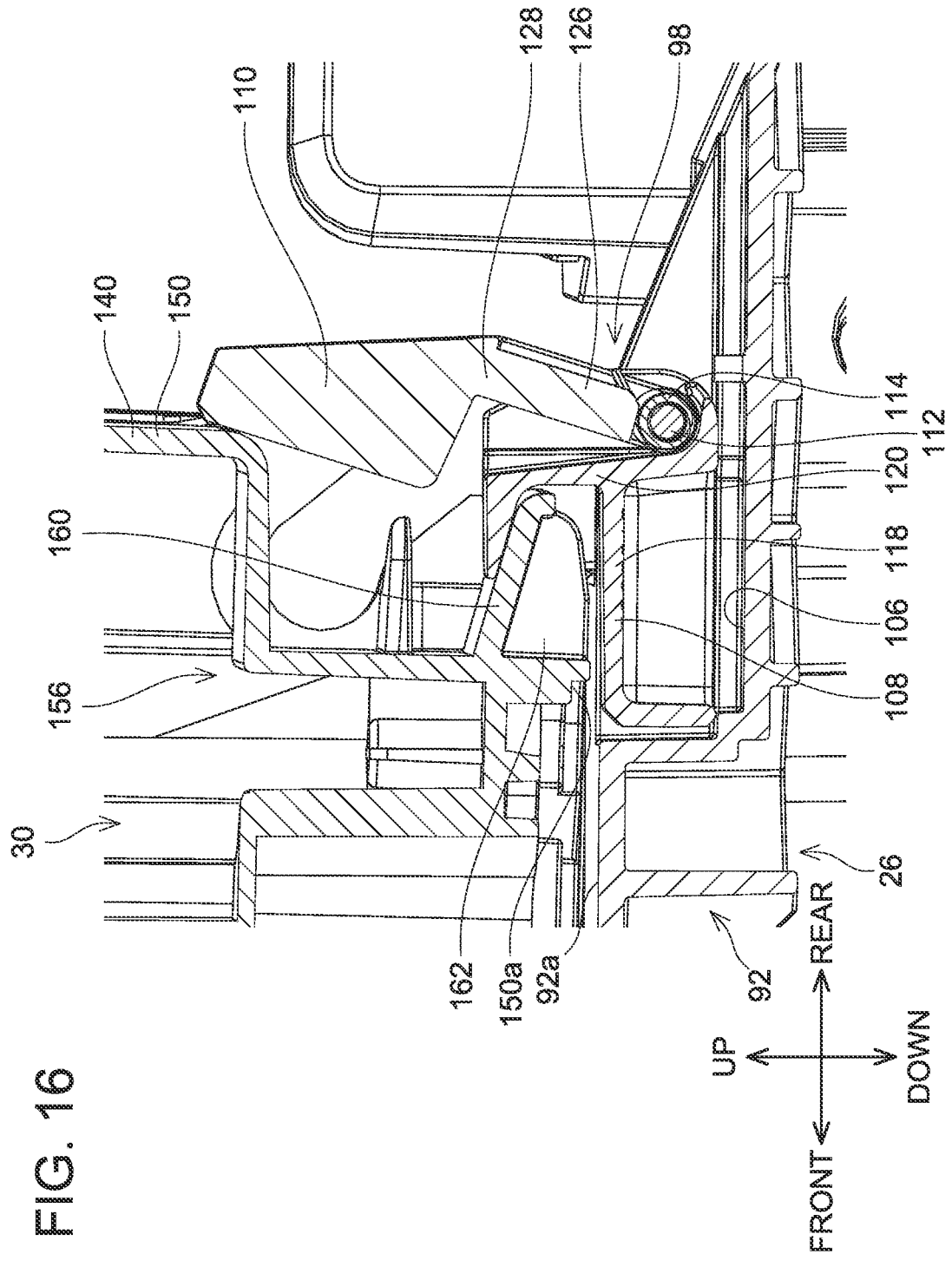
FIG. 16 is a cross-sectional view of the vicinity of the third machine-side engagement part 98 in a state where the second power supply 30 according to the embodiment is attached to the power supply receptacle 26.

Next, the user lays down die second power supply 30 in the tilted state toward the reference surface 92*a* to bring the lower surface 150*a* of the second lower housing 150 into contact with the reference surface 92*a*. As shown in FIG. 16, the upper surfaces of the lower engagement parts 118 abut on the second lower housing 150, swing frontward around the swing shafts 112, and return to the initial positions shown in FIG. 3. On the other hand, the auxiliary members 110 swing frontward while being in contact with the second lower housing 150 by the biasing force of die biasing members 114, but do not return to the initial positions shown in FIG. 3.

In addition, when the second power supply 30 in the tilted state is laid down toward the reference surface 92*a* and the second specific engagement pawl 166 thereby abuts on an upper surface of the rear wall 99 of the second machine-side engagement part 96, the second specific engagement pawl 166 swings in a first direction around the swing shaft 168. In FIG. 17, the first direction is equal to a clockwise direction. As shown in FIG. 17, when a tip of the second specific engagement pawl 166 moves to a spot lower than die horizontal wall 101, the second specific engagement pawl 166 swings in a second direction around the swing shaft 168 by biasing force which the operation member 170 receives from the biasing member 172, by which the second specific engagement pawl 166 engages with the horizontal wall 101. Due to this, the second power supply 30 is fixed and attached to the power supply receptacle 26 without the lower surface 150*a* of the second lower housing 150 floating from the reference surface 92*a*. The second direction is a direction opposite to the first direction.

When the second power supply 30 is to be removed from the power supply receptacle 26, the user pushes in the operation member 170 with a finger. Due to this, the second specific engagement pawl 166 swings in the first direction, and the engagement between the second specific engagement pawl 166 and the horizontal wall 101 is released. In this state, the user tilts the second power supply 30 in the direction separating away from the reference surface 92*a*, and pulls the second common engagement pawls 160 out of the respective spaces between the lower engagement part 118 and the upper engagement part 122 of the engagement members 108. As a result, the engagement between the second common engagement parts 156 and the third machine-side engagement parts 98 is released without the engagement members 108 and the auxiliary members 110 being directly operated by the user. In addition, both the engagement members 108 and the auxiliary members 110 swing frontward by the biasing force of the biasing members 114 and return to the initial positions shown in FIG. 3.

(Effect)

The working machine 2 disclosed herein is configured to operate with electric power supplied from the first power supply 28 or the second power supply 30 and configured to be used in a state of being in contact with a ground. The first power supply 28 comprises the battery cells; the first housing 32 configured to house the battery cells; the first power cable 34 extending from the first housing. 32 and configured to discharge electric power; and the first connector 36 disposed at the end of the first power cable 34. The second power supply 30 comprises the battery cells; die second housing 140 configured to house the battery cells; the second power cable 144 extending from the second housing 140 and configured to discharge electric power; and the second connector 146 disposed at the end of the second power cable 144. The first housing 32 of the first power supply 28 and the second housing 140 of the second power supply 30 have different shapes from each other. The working machine 2 comprises the power supply receptacle 26 to which either the first power supply 28 or the second power supply 30 is configured to be detachably attached; and the connector coupler 48 configured to be coupled with either the first connector 36 or the second connector 146.

In the above configuration, the working machine 2 can be used with the first power supply 28 being attached to the power supply receptacle 26, or the working machine 2 can also be used with the second power supply 30 having a housing shape different from that of the first power supply 28 being attached to the power supply receptacle 26. Due to this, a plurality of types of power supplies 28, 30 having different housing shapes can be used for the working machine 2.

The first power supply 28 further comprises the first specific engagement parts 78 disposed on the first housing 32. The second power supply 30 further comprises the second specific engagement part 158 disposed on the second housing 140. The power supply receptacle 26 comprises the first machine-side engagement parts 94 disposed at the positions corresponding to the first specific engagement parts 78 and engageable with the first specific engagement parts 78 to fix the first power supply 28 to the power supply receptacle 26; and the second machine-side engagement part 96 disposed at the position corresponding to the second specific engagement part 158 and engageable with the second specific engagement part 158 to fix the second power supply 30 to the power supply receptacle 26.

In the above configuration, the first power supply 28 can be firmly fixed to the power supply receptacle 26, and the second power supply 30 can be firmly fixed to the power supply receptacle 26.

The first power supply 28 further comprises the first common engagement parts 76 disposed on the first housing 32. The second power supply 30 further comprises the second common engagement parts 156 disposed on the second housing 140. The power supply receptacle 26 further comprises the third machine-side engagement parts 98 disposed at the positions corresponding to both the first common engagement parts 76 and the second common engagement parts 156 and engageable with either the first common engagement parts 76 or the second common engagement parts 156 to fix either the first power supply 28 or the second power supply 30 to the power supply receptacle 26.

In the above configuration, the third machine-side engagement parts 98 are engageable with the common engagement parts 76 of the first power supply 28 and also is engageable with the common engagement parts 156 of the second power supply 30. Thus, the configuration of the power supply receptacle 26 can be prevented from becoming complicated.

The engagement member(s) 108 according to an embodiment may be swingable about swing shaft(s), and its auxiliary member(s) 110 may be swingable about another swing shaft(s).

The strength of the engagement members 108 according to one embodiment may be equal to or less than the strength of the auxiliary members 110.

The working machine 2 according to one embodiment is not limited to a lawn mower, and may be, for example, a carrier, a cultivator, a sweeper for sweeping a floor, a vacuum cleaner, or a lifting device.

What is claimed is:

1. A working machine configured to operate with electric power supplied from a first power supply or a second power supply and configured to be used in a state of being in contact with a ground, wherein each of the first power supply and the second power supply comprises:

a battery cell;

a housing configured to house the battery cell;

a power cable extending from the housing and configured to discharge electric power; and a connector disposed at an end of the power cable, the housing of the first power supply and the housing of the second power supply have different shapes from each other, the working machine comprising:

a power supply receptacle to which either the first power supply or the second power supply is configured to be detachably attached; and a connector coupler configured to be coupled with the connector, each of the housing of the first power supply and the housing of the second power supply is configured to be interchangeably fixed to the power supply receptacle so that when the housing of the first power supply is fixed to the power supply receptacle, the housing of the second power supply cannot be fixed to the power supply receptacle, and when the housing of the second power supply is fixed to the power supply receptacle, the housing of the first power supply cannot be fixed to the power supply receptacle, the first power supply further comprises a first specific engagement part disposed on the housing of the first power supply, the second power supply further comprises a second specific engagement part disposed on the housing of the second power supply, the power supply receptacle comprises:

a first machine-side engagement part disposed at a position corresponding to the first specific engagement part and engageable with the first specific engagement part to fix the first power supply to the power supply receptacle; and a second machine-side engagement part disposed at a position corresponding to the second specific engagement part and engageable with the second specific engagement part to fix the second power supply to the power supply receptacle, each of the first power supply and the second power supply further comprises a common engagement part disposed on the housing, the power supply receptacle further comprises a third machine-side engagement part disposed at a position corresponding to the common engagement part of each of both the first and second power supplies and engageable with the common engagement part to fix either the first power supply or the second power supply to the power supply receptacle, and the common engagement part of the first power supply and the common engagement part of the second power supply have a same shape.

2. The working machine according to claim 1, wherein each of the connector of the first power supply and the connector of the second power supply is configured to be interchangeably inserted into the connector coupler, the connector coupler is disposed on a surface of the power supply receptacle, and a cover is attached to the working machine in a position above the connector coupler, wherein in a state of the cover being opened the connector coupler is exposed and in the state of the cover being closed the connector coupler is closed, and the cover is configured to not cover the housing of the first power supply or the housing of the second power supply that is fixed to the power supply receptacle.

\* \* \* \* \*